(12) United States Patent
Swafford et al.

(10) Patent No.: US 7,350,045 B2
(45) Date of Patent: Mar. 25, 2008

(54) DYNAMIC MEMORY HEAP TAGGING

(75) Inventors: Michael Swafford, Bellevue, WA (US); Kevin Charles Chase, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 331 days.

(21) Appl. No.: 10/749,938

(22) Filed: Dec. 31, 2003

(65) Prior Publication Data

US 2005/0144410 A1    Jun. 30, 2005

(51) Int. Cl.
G06F 12/06    (2006.01)
(52) U.S. Cl. .................. 711/170; 707/205; 711/167; 711/172
(58) Field of Classification Search ............. 711/170, 711/171, 172, 173, 100, 154, 156, 153, 167; 707/100, 200, 205, 206
See application file for complete search history.

(56) References Cited

U.S. PATENT DOCUMENTS

| 6,381,682 | B2* | 4/2002 | Noel et al. | 711/153 |
| 6,658,652 | B1* | 12/2003 | Alexander et al. | 711/100 |
| 6,985,976 | B1* | 1/2006 | Zandonadi et al. | 711/170 |
| 7,124,251 | B2* | 10/2006 | Clark et al. | 711/170 |
| 7,133,993 | B1* | 11/2006 | Jackson et al. | 711/172 |
| 7,158,991 | B2* | 1/2007 | Kekre et al. | 707/102 |

2004/0221120 A1* 11/2004 Abrashkevich et al. ..... 711/170

OTHER PUBLICATIONS

Data Structure and Insertion Algorithm for Representing Asynchronous Occurrences for Visualization by Trace Visualization Tools using Ghant Charts with Occurrence Hierarchies; International Business Machines Technical Disclosure Bulletin; vol. 36, No. 07, Jul. 1993; pp. 547-557.*
Petit-Bianco, Alexandre, "Java Garbage Collection for Real-Time Systems", Dr. Dobb's Journal Oct. 1998. www.ddj.com/documents/s=915/ddj9810a/9810a.*
Interrupt Driven Task Scheduler for Systems, IBM Technical Disclosure Bulletin, Mar. 1992.*
Olivier Danvy; *Memory Allocation and Higher-Order Functions*; 1987; pp. 241-252.
Steve Churchill; *Exception Recovery with Smart Pointers*; C++ Report Jan. 1994; pp. 34-42.
Witawas Srisa-an, Chia-Tien Dan Lo, and J. Morrie Chang; *Scalable Hardware-algorithm for Mark-sweep Garbage Collection*; 2000 IEEE; pp. 274-281.

(Continued)

*Primary Examiner*—Pierre-Michel Bataille
(74) *Attorney, Agent, or Firm*—Merchant & Gould P.C.

(57) ABSTRACT

A data structure within a block of allocable memory of a memory structure such as a heap is used to identify the function that is responsible for causing memory problems such as random overwrites, buffer overruns, double or multiple "frees," and the like. The data structure can use the return address of the function that allocates or frees the allocable memory block to identify the caller. An identifier for the function is generated and stored in the allocable memory block.

27 Claims, 6 Drawing Sheets

OTHER PUBLICATIONS

Jonathan D. Bright, Gregory F. Sullivan and Gerald M. Masson; *Checking the Integrity of Trees*; 1995 IEEE; pp. 402-411.

Hamed Seyed-allaei; *Finite-size Scaling Approach to Dynamic Storage Allocation Problem*; Science Direct Apr. 2003; pp. 563-569.

Kelvin Nilsen; *Reliable Real-Time Garbage Collection of C++*; 1994 the USENIX Association, Computing Systems, vol. 7, No. 4, Fall 1994; pp. 467-504.

Steve Oualline; *Heap Checking—A pair of libraries for handling heap-related bugs; Dr. Dobb's Journal*, Nov. 1993; pp. 28-32.

Lawrence D. Spencer; *Debugging Memory Allocation Errors—Replacing standard C functions and checking the status of heap*; Dr. Dobb's Journal, Aug. 1990; pp. 716-719, 782-784.

Tom Schotland and Peter Petersen; *Exception Handling in C Without C++—Clean error handling without overhead*; Dr. . Dobb's Journal, Nov. 2000; pp. 102-110.

Tom Loveless; *Code-Spionage füreinen guten Zweck; Elektronik* Mar. 2000: pp. 140-145.

\* cited by examiner

DYNAMIC MEMORY HEAP TAGGING

BACKGROUND OF THE INVENTION

Many computer applications and operating systems use a heap-based memory-allocation scheme to manage the usage of memory resources within a computer system. For example, an application process can request a block of memory from the heap for its own use and then return control of the block of memory when the application has finished using the block. All too often, a process can cause problems with the heap by mishandling protocols associated with the heap and/or corrupting memory stored on the heap.

Heap corruptions/memory problems can take many forms including random overwrites, buffer overruns, "double frees," and memory "leaks." Random overwrites typically occur when a process references already freed memory or when other errors cause pointers to be misdirected. Buffer overruns typically occur when a process allocates a block of memory that is too small and writes over and beyond the end of the allocated block. Double frees occur when a process frees the same buffer twice, which leads to the possibility of the freed block of data being allocated twice. Memory leaks may occur, for example, when an application repeatedly requests more memory space (often while not efficiently using the memory space it has already allocated).

Heap corruptions are typically one of the most difficult types of bugs to locate and identify. Because of the dynamic nature of the heap, they are often difficult to reproduce and/or to document because traces of the corruption may be erased before the source of the problem is identified. Furthermore, heap corruptions may occur in systems that are being used by customers, which can complicate attempts at debugging and maintenance. What is needed is a mechanism to improve the diagnostic capabilities of system tools for maintenance and debugging heap corruptions and memory problems.

SUMMARY OF THE INVENTION

The present invention is directed towards providing diagnostic heap tagging for dynamic memory such as heap memory in computer systems.

According to one aspect of the invention, a method for tagging an allocable memory block, comprises determining the identity of a routine performing one of requesting the allocable memory block, requesting the size of the allocable memory block, and freeing the allocable memory block. An identifier for the routine is generated. The identifier is stored in the allocable memory block.

According to another aspect of the invention, a computer-readable medium having computer-executable components for tagging an allocable memory block comprises three components. The first component is arranged to determine the identity of a routine performing one of requesting the allocable memory block, requesting the size of the allocable memory block, and freeing the allocable memory block. The second component is arranged to generate an identifier for the routine. The third component is arranged to store the identifier in the allocable memory block.

According to yet another aspect of the invention, a system for tagging an allocable memory block comprises a computer memory, a routine identifier, an identifier generator, and a diagnostic tagger. The computer memory comprises a heap in which allocable memory blocks can be allocated and freed. The routine identifier is arranged to determine the identity of a routine performing one of requesting the allocable memory block, requesting the size of the allocable memory block, and freeing the allocable memory block. The identifier generator is arranged to generate an identifier for the routine. The diagnostic tagger is arranged to store the identifier in the allocable memory block.

DETAILED DESCRIPTION OF THE PREFERRED EMBODIMENT

The present invention is directed towards providing a data structure within a block of allocable memory of a memory structure such as a heap to identify the code that is responsible for causing memory problems such as random overwrites, buffer overruns, double or multiple "frees," and the like. The data structure can use the return address of the caller that allocates or frees the allocable memory block to identify the function. An identifier for the function is generated and stored in the allocable memory block.

Illustrative Operating Environment

Figure 1:
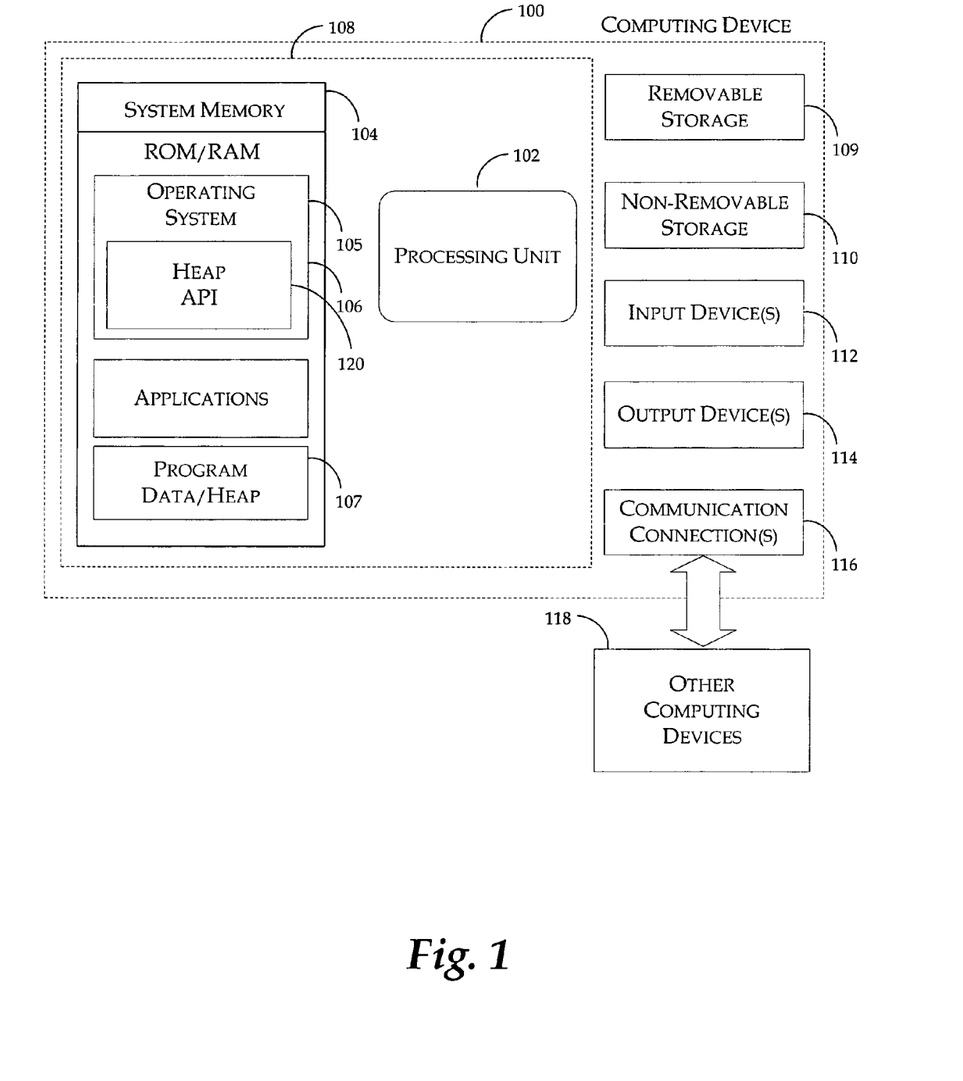
FIGS. 1 and 2 illustrate exemplary computing devices that may be used according to exemplary embodiments of the present invention.

With reference to FIG. 1, one exemplary system for implementing the invention includes a computing device, such as computing device 100. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more applications 106, and may include program data 107. Program data 107 typically includes a heap and/or multiple heaps. In one embodiment, operating system 105 may include a heap API 120. This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included.

Computing device 100 may also contain communication connections 116 that allow the device to communicate with other computing devices 118, such as over a network. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 2:
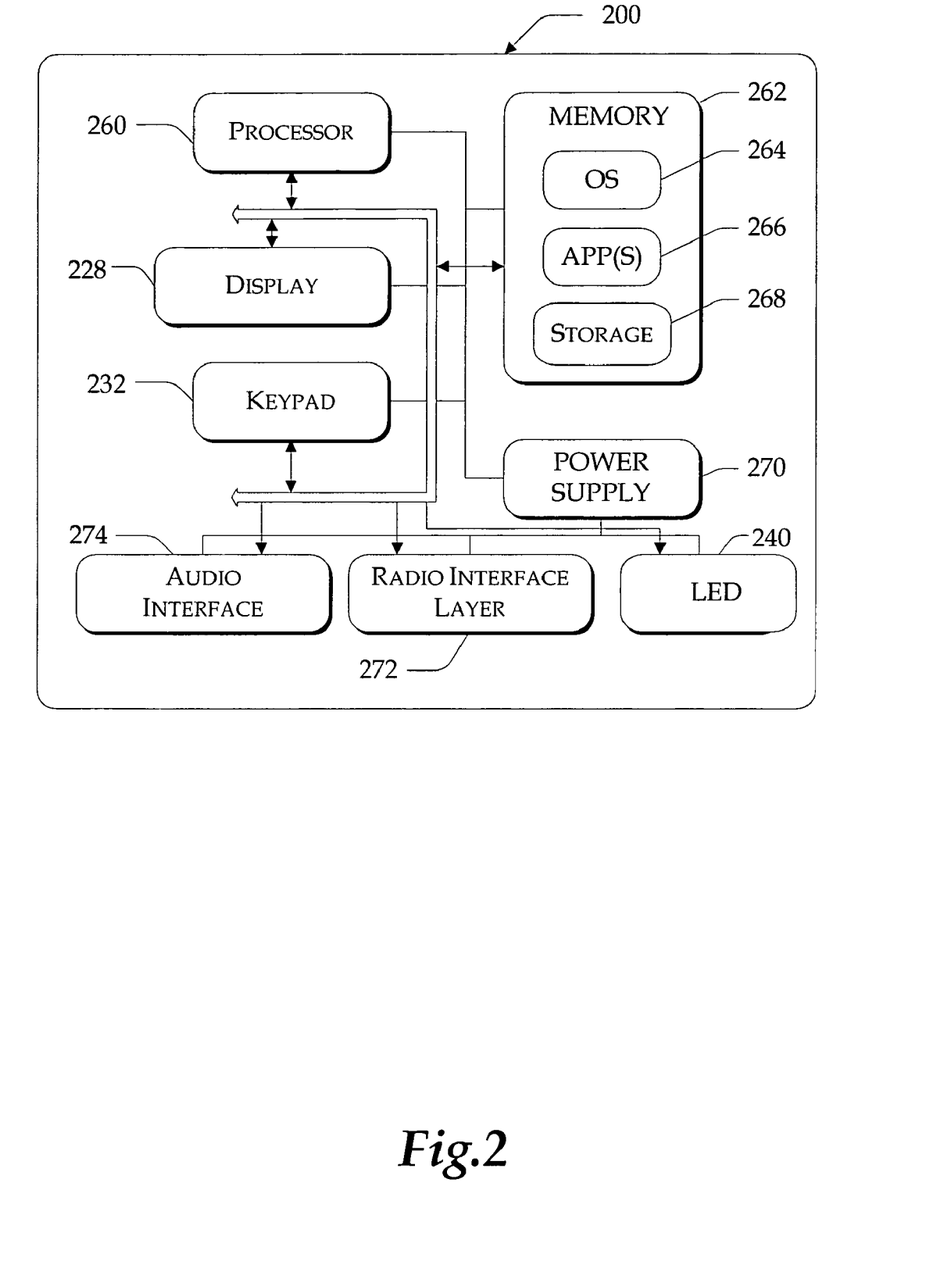

FIG. 2 illustrates a mobile computing device that may be used according to an exemplary embodiment of the present invention. Mobile computing device 200 includes processor 260, memory 262, display 228, and keypad 232. Memory 262 generally includes both volatile memory (e.g., RAM) and non-volatile memory (e.g., ROM, Flash Memory, or the like). Mobile computing device 200 includes operating system 264, such as the Windows CE operating system from Microsoft Corporation, or another operating system, which is resident in memory 262 and executes on processor 260. Keypad 232 may be a push button numeric dialing pad (such as on a typical telephone), a multi-key keyboard (such as a conventional keyboard). Display 228 may be a liquid crystal display, or any other type of display commonly used in mobile computing devices. Display 228 may be touch-sensitive, and would then could also act as an input device.

One or more application programs 266 are loaded into memory 262 and run on the operating system 264. A spell checking application resides on mobile computing device 200 and is programmed to provide operations relating to a spell checking operation. The spell checking application may reside in the hardware or software of the device. Mobile computing device 200 also includes non-volatile storage 268 within memory 262. Non-volatile storage 268 may be used to store persistent information which should not be lost if mobile computing device 200 is powered down.

Mobile computing device 200 includes power supply 270, which may be implemented as one or more batteries. Power supply 270 might further include an external power source, such as an AC adapter or a powered docking cradle that supplements or recharges the batteries.

Mobile computing device 200 is shown with two types of optional external notification mechanisms: LED 240 and audio interface 274. These devices may be directly coupled to power supply 270 so that when activated, they remain on for a duration dictated by the notification mechanism even though processor 260 and other components might shut down to conserve battery power. Audio interface 274 is used to provide audible signals to and receive audible signals from the user. For example, audio interface 274 may be coupled to a speaker for providing audible output and to a microphone for receiving audible input, such as to facilitate a telephone conversation.

Mobile computing device 200 also includes wireless interface layer 272 that performs the function of transmitting and receiving wireless communications. The wireless interface layer 272 facilitates wireless connectivity between the mobile computing device 200 and the outside world. According to one embodiment, transmissions to and from the wireless interface layer 272 are conducted under control of the operating system 264. In other words, communications received by wireless interface layer 272 may be disseminated to application programs 266 via operating system 264, and vice versa.

Communications connections are an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Dynamic Memory Heap System

Figure 3:
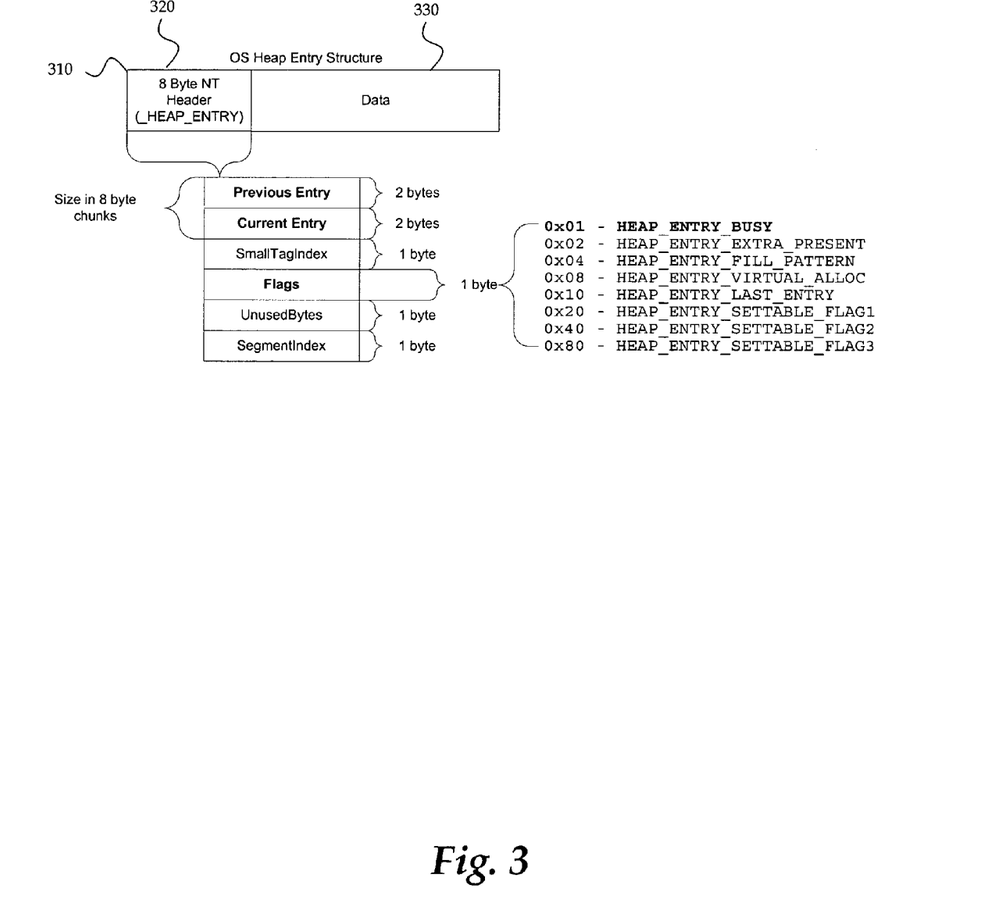
FIG. 3 is a data structure diagram generally illustrating a conventional heap entry structure that is used in accordance with aspects of the invention.

FIG. 3 is a data structure diagram generally illustrating a conventional heap entry structure that is used in accordance with aspects of the invention. Heap entry structure 310 is an example entry in a heap that is managed by a memory management system in computing devices such as the one described above in conjunction with FIG. 1 and/or mobile computing devices such as the one described above in conjunction with FIG. 2. The actual heap entry structure may vary in accordance with the various memory management systems used in different operating systems.

Heap entry structure 310 typically comprises header 320 and data field 330. Header 320 typically comprises byte-aligned information that is used for various bookkeeping information of the heap. The header comprises information such as Previous Entry, Current Entry, Tag Index, Flags, Unused bytes, and Segment Index.

In accordance with the present invention, an additional 8 bytes is added to the requested allocation size of a block of memory when memory is being allocated. The additional 8 bytes is used to store (in addition to other information) the return address to the caller that allocated the memory. The 8-byte header is representative for a 32-bit computer architecture. The example 8-byte header shown herein can be adapted to other architectures (such as a 64-bit architecture, for example) by lengthening or shortening the header structure accordingly.

Figure 4:
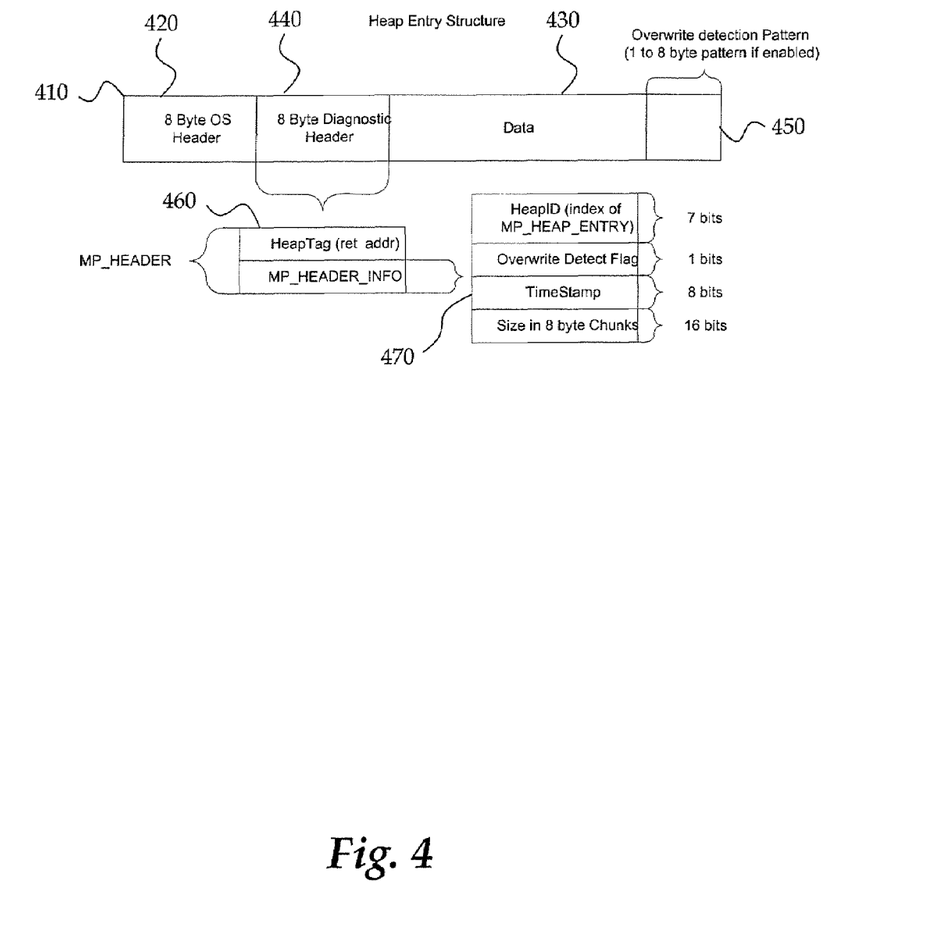
FIG. 4 is a data structure diagram generally illustrating a heap tag process identifier in a heap entry structure that is used in accordance with aspects of the invention.

FIG. 4 is a data structure diagram generally illustrating a heap tag function identifier in a heap entry structure that is used in accordance with aspects of the invention. Heap entry structure 410 typically comprises header 420, data field 430, diagnostic header 440, and optionally overwrite detection pattern 450. Diagnostic header 440 comprises heap tag 460 and optionally comprises other information such as miscellaneous header information, heap entry index (which can be used to point to one of a plurality of heaps), overwrite detect flag, timestamp, and size. The timestamp 470 within the allocable memory block indicates the time when one of requesting and freeing the allocable memory block is performed. Heap tag 460 typically comprises the return address of the function that allocated the memory. In other embodiments, an identifier of the function that allocated the memory can be used such that the return function that allocated the memory can be later identified.

The return address can be obtained by "peeking" at one level up on the call stack. An example routine for obtaining the return address in x86 assembly language is given as follows:

```
DWORD_PTR
_stdcall GetReturnAddress ( )
{
    DWORD_PTR *pStack;
    DWORD_PTR *pStackOrig;
    _asm may pStack, ebp
    pStackOrig = pStack;
    pStack = (DWORD_PTR *) *pStack;
    return * (pstack + 1);
}
```

The function can be stored as an API which can be called by a function.

If the function that allocated the memory is a wrapper function (which allocates memory on behalf of another process, such as the C++"new" operator), then an API can be provided to peek two levels up the call stack to obtain the return address of the caller that invoked the wrapper.

The return address is used to assign code "ownership" to all memory that is allocated within various heap structures. Accordingly, any allocated block of memory within the heap that is identified as having a problem (such as a memory leak or being corrupted memory) can be associated with a particular code routine. The address stored in an allocated block of memory identifies the code that requested the allocated memory block. The address may be, for example, the return address of the function that requested the allocated memory block. Thus, if the memory block is associated with a problem, the address can be used to identify the source of the memory problem.

Additionally, the return address of the caller that requests that a block of memory be freed is obtained and stored (for example, in the freed memory block) before the freed memory block is returned to the operating system heap. The information can be used, for example, to identify (erroneous) multiple "frees" of the same memory block.

Figure 5:
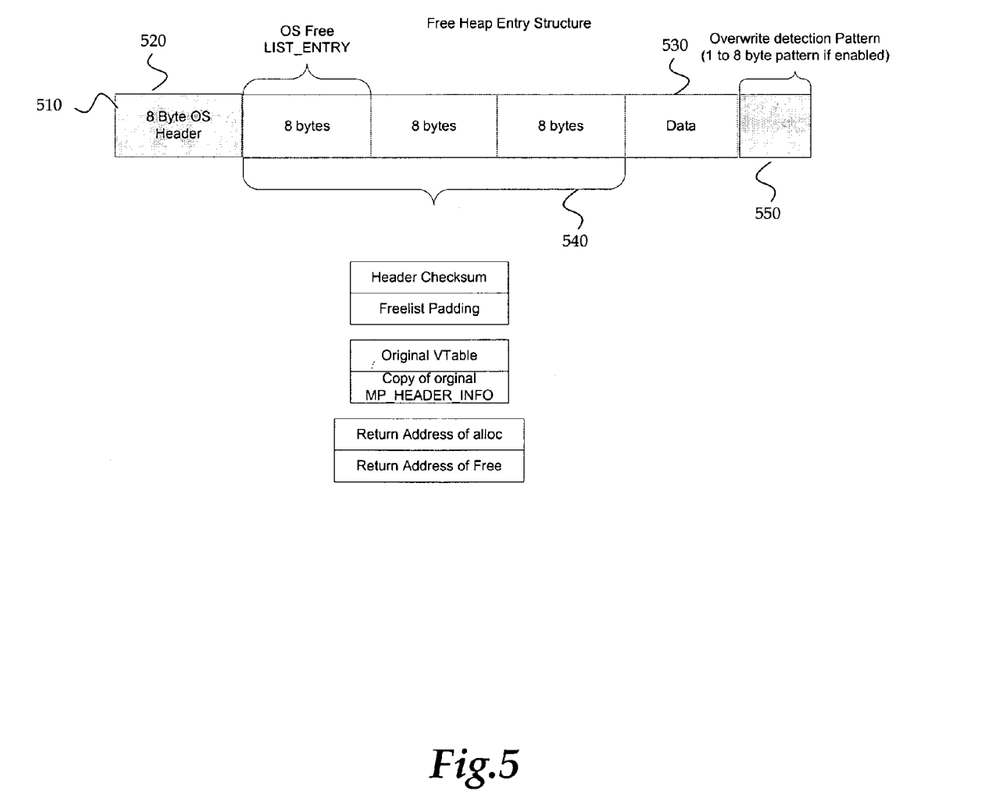
FIG. 5 is a data structure diagram generally illustrating a heap tag process identifier in a freed heap entry structure that is used in accordance with aspects of the invention.

FIG. 5 is a data structure diagram generally illustrating a heap tag process identifier in a freed heap entry structure that is used in accordance with aspects of the invention. Heap entry structure 510 typically comprises operating system (OS) header 520, data field 530, diagnostic header 540, and optionally overwrite detection pattern 550.

As shown in the figure, diagnostic header 540 typically comprises diagnostic information such as a checksum entry, an identifier of the code (or routine) that allocated the memory, and an identifier of the code (or routine that freed the memory.

The checksum can be formed by evaluating the contents of the free heap entry structure as originally written and re-evaluated at a later time to see whether, for example, data in the structure has been (erroneously) modified. For example, invariant sections of the memory block allocation are determined. The invariant sections are checksummed and the resulting checksum is written into the memory itself. A mechanism (such as a delayed freelist) can be used to defer returning the memory to the heap manager. Before actually freeing or reusing the memory, the checksum can be validated.

The identifiers for the routines that free or allocate the memory can be the return addresses of the routines (as described above with reference to FIG. 4).

The return address of every caller that frees a block of memory is typically stored in the freed block of memory such that the first double word (which may be a signature such as a C++vtable) is not overwritten. Furthermore, the information should be written away from locations that are used by the operating system heap manager. The information can additionally be used to more easily detect modification of the memory after it has been freed.

Optionally, overwrite detection can be used in accordance with the present invention. For example, the optional overwrite detection pattern 450 and/or 550 can be used to detect whether a particular memory block has been overwritten. Typically heap memory block data structures are padded (if necessary) to eight-byte boundaries, which can leave up to seven bytes available for the pattern. Other dynamic memory allocators may pad differently, the scheme here can be adapted by lengthening or shortening the pattern accordingly. If a data structure is already block aligned (and not already padded), an extra eight bytes is requested in which the pattern is to be written.

Table 1 shows example patterns (in hexadecimal) for overwriting protection:

TABLE 1

| 8-(Size Mod 8) | Overwrite tail used | | | | | | | |
|---|---|---|---|---|---|---|---|---|
| 1 | ?? | ?? | ?? | ?? | ?? | ?? | ?? | 01 |
| 2 | ?? | ?? | ?? | ?? | ?? | ?? | 02 | 02 |
| 3 | ?? | ?? | ?? | ?? | ?? | 03 | 03 | 03 |
| 4 | ?? | ?? | ?? | ?? | 04 | 04 | 04 | 04 |
| 5 | ?? | ?? | ?? | 05 | 05 | 05 | 05 | 05 |
| 6 | ?? | ?? | 06 | 06 | 06 | 06 | 06 | 06 |
| 7 | ?? | 07 | 07 | 07 | 07 | 07 | 07 | 07 |
| 8 | 08 | 08 | 08 | 08 | 08 | 08 | 08 | 08 |

If the allocation has overwrite detection enabled, a portion of the allocation can be reserved for the overwrite detection pattern. To save on space, a different pattern can be used for different allocation sizes. If the allocation size is not a multiple of eight, the size is usually rounded up to the next multiple of eight and the extra area is used for overwrite detection. If the size is a multiple of eight, then eight extra bytes are added. Since typical heap implementations only allow allocation in eight-byte increments, extra memory for allocations is only needed for memory blocks that are multiples of eight bytes already.

When memory is passed back to the operation system for any reason (typically freeing the memory, reallocating a larger/smaller buffer, or querying the size of the allocation), the overwrite detection pattern is typically checked. If the overwrite pattern has been modified, an access violation can be forced and the code that has caused the bug can be easily identified (instead of, for example, hitting a random crash a few minutes later).

The pattern shown in Table 1 encodes the size of the pattern within the last byte of the pattern, which enables the appropriate pattern to be ascertained readily. The pattern contains characters that are not typically used as part of the ASCII character set, which facilitates detection of string overruns. The pattern does not contain the NUL (e.g., '\0') character, which is a very common 1-byte overrun caused by failure to allocate space for the terminating NUL character of a string.

Table 2 shows additional example patterns (in hexadecimal) for overwriting protection:

TABLE 2

| 8-(Size Mod 8) | Overwrite tail used | | | | | | | |
|---|---|---|---|---|---|---|---|---|
| 1 | ?? | ?? | ?? | ?? | ?? | ?? | ?? | 42 |
| 2 | ?? | ?? | ?? | ?? | ?? | ?? | 42 | 61 |
| 3 | ?? | ?? | ?? | ?? | ?? | 42 | 61 | 00 |
| 4 | ?? | ?? | ?? | ?? | 42 | 61 | 00 | F7 |
| 5 | ?? | ?? | ?? | 42 | 61 | 00 | F7 | 06 |
| 6 | ?? | ?? | 42 | 61 | 00 | F7 | 06 | 05 |
| 7 | ?? | 42 | 61 | 00 | F7 | 06 | 05 | 04 |
| 8 | 42 | 61 | 00 | F7 | 06 | 05 | 04 | 0B |

Table 2 illustrates using portions (or the whole) of a pattern, which facilitates calculation of the pattern size. The NUL character is included after the first byte, which facilitates detection of problems associated with strings that have missing terminating NUL characters. The pattern also includes (where space permits) both upper and lower case characters, which helps in detection of errant "toupper" and "tolower" constructs. Additionally the logical OR of all the bytes in the overwrite detect pattern is 0xFF, which helps to highlight corruptions that arbitrarily clear any bit. (Any logical function that typically provides a predetermined result that can be compared against an expected value can be used to evaluate the integrity of the overwrite detection pattern.)

Figure 6:
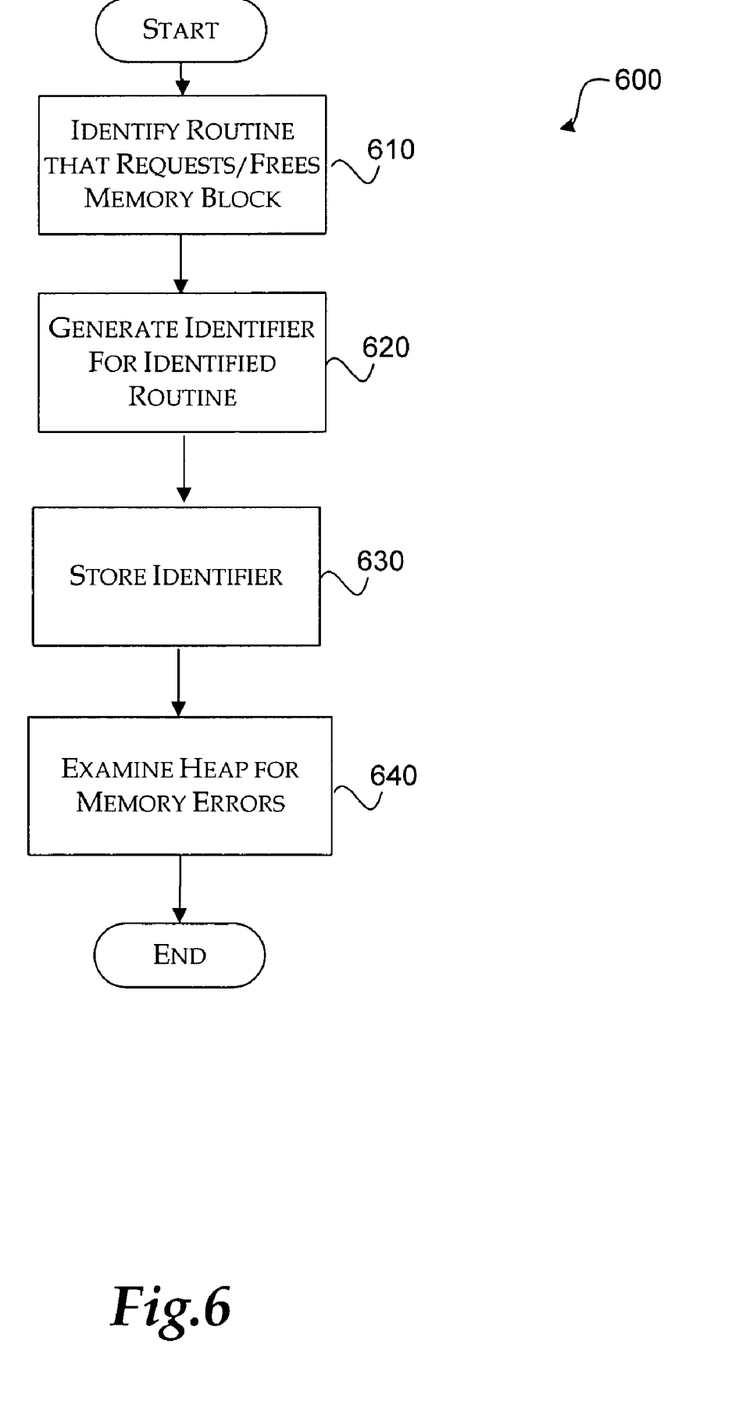
FIG. 6 is a flow diagram providing diagnostic heap tagging in a heap entry structure that is used in accordance with aspects of the invention.

FIG. 6 is a flow diagram providing diagnostic heap tagging in a heap entry structure that is used in accordance with aspects of the invention. The process 600 enters at block 610, where the routine that requests (or frees) memory a memory block is identified. The routine can be identified for example by examining a return address that is pushed onto the program stack.

In block 620, an identifier is generated for the identified routine. The identifier can be the return address itself. At block 630, the identifier is stored. The identifier is typically stored with the requested/freed memory itself.

In block 640, the heap is examined for the presence of errors such as can take many forms including random overwrites, buffer overruns, "double frees," and memory leaks. The heap can be examined by a human using debugger routines and/or software routines that perform heuristics upon the stack. The routines can be performed while a system is "running" or the routines can be performed upon a "core dump" of the memory. Example automated routines can include validating checksums on allocated and/or freed memory blocks, evaluating overwrite protection patterns, and the like.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A system for tagging an allocable memory block, comprising:
   a computer memory that comprises a heap in which allocable memory blocks can be allocated and freed;
   a routine identifier that is arranged to determine the identity of a routine performing one of requesting the allocable memory block, requesting the size of the allocable memory block, and freeing the allocable memory block;
   an identifier generator that is arranged to generate an identifier for the routine;
   a diagnostic tagger that is arranged to store the identifier in the allocable memory block; and
   a memory timestamp system that is arranged to store a timestamp within the allocable memory block, wherein the timestamp is configured to indicate a time when:
      the requesting of the allocable memory block is performed unless the timestamp indicates a time when the allocable memory block is freed; and
      the freeing of the allocable memory block is performed unless the timestamp indicates a time when the allocable memory block is requested,
   such that, upon detection of a memory usage error involving the allocable memory block, the identifier for the routine and the timestamp provide information usable in determining whether if the routine is causing memory errors.

2. The system of claim 1, further comprising a memory verification system that is arranged to examine the heap to determine the presence of memory errors.

3. The system of claim 2, further comprising a memory verification system that is arranged to perform a checksum on the allocable memory block and storing the results of the checksum within the allocable memory block.

4. The system of claim 3, further comprising a memory verification system that is arranged to examine the results of the checksum to determine the presence of memory errors.

5. The system of claim 1, wherein the identifier is the return address of the identified routine.

6. The system of claim 1, further comprising a memory verification system that is arranged to write a memory overwrite detection pattern within the allocable memory block.

7. The system of claim 6, wherein the memory overwrite detection pattern is written within an area of the allocable memory block that is used for alignment purposes.

8. The system of claim 1, wherein an identifier is generated and stored for a routine that requests the allocable memory block and an identifier is generated and stored for a routine that frees the memory block.

9. The system of claim 1, further comprising a memory indexing system that is arranged to store a heap index for the allocable memory block within the allocable memory block, wherein the heap index points to one of a plurality of heaps.

10. A method for tagging an allocable memory block, comprising:
    determining the identity of a routine performing one of requesting the allocable memory block, requesting the size of the allocable memory block, and freeing the allocable memory block;
    generating an identifier for the routine;
    storing the identifier in the allocable memory block; and
    storing a timestamp within the allocable memory block, wherein the timestamp is configured to indicate a time when:
       the requesting of the allocable memory block is performed unless the timestamp indicates a time when the allocable memory block is freed; and
       the freeing of the allocable memory block is performed unless the timestamp indicates a time when the allocable memory block is requested, such that, upon detection of a memory usage error involving the allocable memory block, the identifier for the routine and the timestamp provide information usable in determining whether the routine is causing memory errors.

11. The method of claim 10, further comprising examining the heap to determine the presence of memory errors.

12. The method of claim 1, further comprising performing a checksum on the allocable memory block and storing the results of the checksum within the allocable memory block.

13. The method of claim 12, further comprising examining the results of the checksum to determine the presence of memory errors.

14. The method of claim 10, wherein the identifier is the return address of the identified routine.

15. The method of claim 10, further comprising writing a memory overwrite detection pattern within the allocable memory block.

16. The method of claim 15, wherein the memory overwrite detection pattern is written within an area of the allocable memory block that is used for alignment purposes.

17. The method of claim 10, wherein an identifier is generated and stored for a routine that requests the allocable memory block and an identifier is generated and stored for a routine that frees the memory block.

18. The method of claim 10, further comprising storing a heap index for the allocable memory block within the allocable memory block, wherein the heap index points to one of a plurality of heaps.

19. A computer-readable storage medium having computer-executable components for tagging an allocable memory block, comprising:
- a first component that is arranged to determine the identity of a routine performing one of requesting the allocable memory block, requesting the size of the allocable memory block, and freeing the allocable memory block;
- a second component that is arranged to generate an identifier for the routine;
- a third component that is arranged to store the identifier in the allocable memory block; and
- a fourth component that is arranged to store a timestamp within the allocable memory block, wherein the timestamp is configured to indicate a time when:
  - the requesting of the allocable memory block is performed unless the timestamp indicates a time when the allocable memory block is freed; and
  - the freeing of the allocable memory block is performed unless the timestamp indicates a time when the allocable memory block is requested, such that, upon detection of a memory usage error involving the allocable memory block, the identifier for the routine and the timestamp provide information usable in determining whether if the routine is causing memory errors.

20. The computer-readable storage medium of claim 19, further comprising an examination component that is arranged to examine the heap to determine the presence of memory errors.

21. The computer-readable storage medium of claim 20, further comprising a checksum component that is arranged to perform a checksum on the allocable memory block and storing the results of the checksum within the allocable memory block.

22. The computer-readable storage medium of claim 21, further comprising a checksum examination component that is arranged to examine the results of the checksum to determine the presence of memory errors.

23. The computer-readable storage medium of claim 19, wherein the identifier is the return address of the identified routine.

24. The computer-readable storage medium of claim 19, further comprising a pattern component that is arranged to write a memory overwrite detection pattern within the allocable memory block.

25. The computer-readable storage medium of claim 24, wherein the memory overwrite detection pattern is written within an area of the allocable memory block that is used for alignment purposes.

26. The computer-readable storage medium of claim 19, wherein an identifier is generated and stored for a routine that requests the allocable memory block and an identifier is generated and stored for a routine that frees the memory block.

27. The computer-readable storage medium of claim 19, further comprising an indexing component that is arranged to store a heap index for the allocable memory block within the allocable memory block, wherein the heap index points to one of a plurality of heaps.

* * * * *